United States Patent [19]

Asbill, III

[11] Patent Number: 4,996,885

[45] Date of Patent: * Mar. 5, 1991

[54] DIFFERENTIAL PRESSURE TRANSMITTER, A SQUARE ROOT EXTRACTOR

[75] Inventor: Clarence M. Asbill, III, Richmond, Va.

[73] Assignee: RobertShaw Controls Company, Richmond, Va.

[*] Notice: The portion of the term of this patent subsequent to May 30, 2006 has been disclaimed.

[21] Appl. No.: 485,454

[22] Filed: Feb. 27, 1990

Related U.S. Application Data

[62] Division of Ser. No. 329,756, Mar. 28, 1989, Pat. No. 4,922,760, which is a division of Ser. No. 114,789, Oct. 30, 1987, Pat. No. 4,833,924.

[51] Int. Cl.⁵ .............................................. G01F 1/00
[52] U.S. Cl. .................................................. 73/861.48
[58] Field of Search .................... 73/861.48, 861.51

[56] References Cited

U.S. PATENT DOCUMENTS

| | | | |
|---|---|---|---|
| 2,992,559 | 7/1961 | Martz et al. | 73/861.48 |
| 3,006,190 | 10/1971 | Jansson | 73/861.48 |
| 4,384,492 | 5/1983 | Kreuter | 73/861.48 |

Primary Examiner—Jerry W. Myracle
Attorney, Agent, or Firm—Candor, Candor & Tassone

[57] ABSTRACT

A differential pressure transmitter, a pneumatically operated square root extracting device therefor and methods of making the same are provided, the transmitter comprising a unit for producing an output pneumatic signal from a pneumatic source in relation to the air velocity pressure of air flowing in a passage, a unit that senses the difference between the total pressure and the static pressure of the air flowing in the passage, and a unit for extracting the square root of the air velocity pressure of the air from the pneumatic output signal as the pneumatic output signal is being produced so that the pneumatic output signal is substantially linear with respect to the air velocity of the air flow in the passage whereby the transmitter comprises a linear air velocity transmitter, the unit for extracting the square root comprising a cam having a cam face that defines at least part of the involute of a circle.

2 Claims, 4 Drawing Sheets

DIFFERENTIAL PRESSURE TRANSMITTER, A SQUARE ROOT EXTRACTOR

CROSS REFERENCE TO RELATED APPLICATIONS

This application is a divisional patent application of its copending parent patent application, Ser. No. 329,756, filed Mar. 28, 1989, now U.S. Pat. No. 4,922,760, which, in turn, is a divisional patent application of its copending parent patent application, Ser. No. 114,789, filed Oct. 30, 1987, now U.S. Pat. No. 4,833,924.

BACKGROUND OF THE INVENTION

1. Field of the Invention

This invention relates to a new differential pressure transmitter that comprises a linear air velocity transmitter and to a pneumatically operated square root extractor device for such a transmitter or the like as well as to methods of making such a transmitter and/or such a square root extractor device.

2. Prior Art Statement

It is known to provide a differential pressure transmitter comprising means for producing an output pneumatic signal from a pneumatic source in relation to the air velocity pressure of air flowing in a passage, means that senses the difference between the total pressure and the static pressure of the air flowing in the passage, and means for extracting the square root of the air velocity pressure of the air from the pneumatic output signal as the pneumatic output signal is being produced so that the pneumatic output signal is substantially linear with respect to the air velocity of the air flow in the passage whereby the transmitter comprises a linear air velocity transmitter. For example, see the U.S. Pat. to Kreuter, No. 4,384,492.

SUMMARY OF THE INVENTION

It is one feature of this invention to provide a new differential pressure transmitter that will act as a linear air velocity transmitter.

In particular, it was found according to the teachings of this invention that the square root extractor of a differential pressure transmitter can utilize a cam that has a cam face that defines at least part of the involute of a circle and the resulting operation of the differential pressure transmitter will be relatively accurate.

Accordingly, one embodiment of this invention provides a differential pressure transmitter comprising means for producing an output pneumatic signal from a pneumatic source in relation to the air velocity pressure of air flowing in a passage, means that sense the difference between the total pressure and the static pressure of the air flowing in the passage, and means for extracting the square root of the air velocity pressure of the air from the pneumatic output signal as the pneumatic output signal is being produced so that the pneumatic output signal is substantially linear with respect to the air velocity of the air flow in the passage whereby the transmitter comprises a linear air velocity transmitter, the means for extracting the square root comprising a cam having a cam face that defines at least part of the involute of a circle.

Accordingly, it is an object of this invention to provide a new differential pressure transmitter having one or more of the novel features of this invention as set forth above or hereinafter shown or described.

Another object of this invention is to provide a new method of making such a differential pressure transmitter, the method of this invention having one or more of the novel features of this invention as set forth above or hereinafter shown or described.

Another object of this invention is to provide a new pneumatically operated square root extractor having one or more of the novel features of this invention as set forth above or hereinafter shown or described.

Another object of this invention is to provide a new method of making such a pneumatically operated square root extractor, the method of this invention having one or more of the novel features of this invention as set forth above or hereinafter shown or described.

Other objects, uses and advantages of this invention are apparent from a reading of this description which proceeds with reference to the accompanying drawings forming a part thereof and wherein:

DESCRIPTION OF THE PREFERRED EMBODIMENTS

Figure 1:
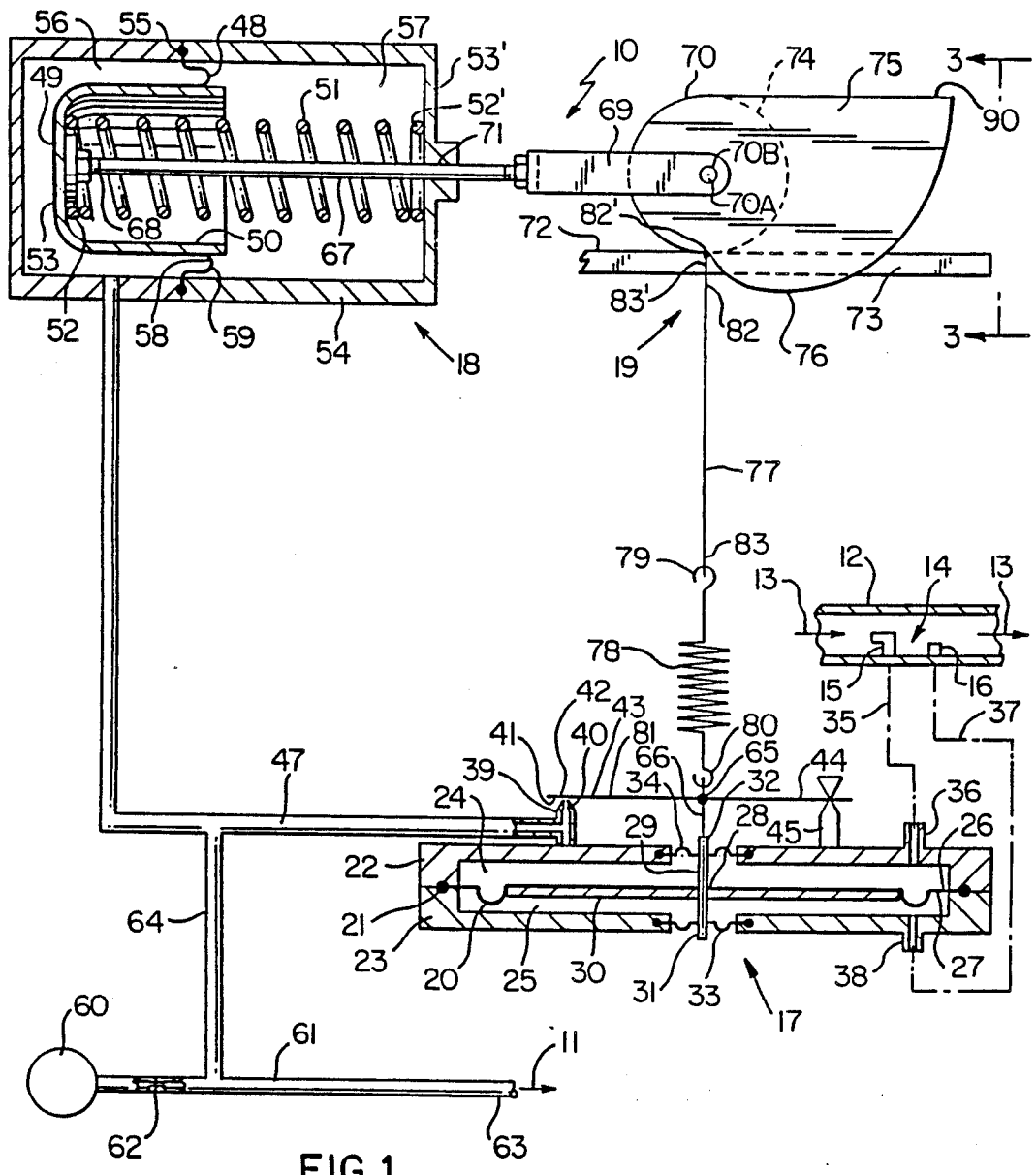
FIG. 1 is a side view, partially in cross section, of the new differential pressure transmitter of this invention.

While the various features of this invention are hereinafter described and illustrated as being particularly adapted to provide a linear air velocity transmitter, it is to be understood that the various features of this invention can be used singly or in various combinations thereof to provide a pneumatically operated control device for other purposes as desired.

Therefore, this invention is not to be limited to only the embodiments illustrated in the drawings, because the drawings are merely utilized to illustrate one of the wide variety of uses of this invention.

Referring now to FIG. 1, the new differential pressure transmitter of this invention is generally indicated by the reference numeral 10 and is shown schematically with the understanding that the various parts thereof could be individually housed and arranged as illustrated or contained within a common housing means as is well known in the art, the transmitter 10 being adapted to provide a substantially linear output signal 11 that is in relation to the air velocity flowing in a duct or passage defining means 12 and represented by the arrows 13 and as measured by a pilot tube arrangement that is generally indicated by the reference numeral 14.

The pilot tube arrangement 14 comprises a tube 15 that is disposed in the passage defining means 12 and that senses the total pressure of the air velocity 13 in the duct 12 and a tube 16 that is also disposed in the duct 12 and that measures the static pressure of the air 13 flowing in the duct or passage defining means 12 in a manner well known in the art.

The pressure differential transmitter 10 of this invention comprises a differential pressure measuring portion or means that is generally indicated by the reference numeral 17, an output pneumatic signal producing portion or means that is generally indicated by the reference numeral 18 and a square root extractor portion or means that is generally indicated by the reference numeral 19.

Since the use of a differential pressure transmitter is well known in the art, such as is set forth in the aforementioned U.S. Pat. to Kreuter, No. 4,384,492 whereby this patent is being incorporated into this disclosure by this reference thereto, a further discussion of the reasons for the use of the transmitter 10 in connection with the duct means 12 will not be set forth. However, the details of the structure and operation of the transmitter 10 of this invention will now be described.

The means 17 for measuring the differential pressure comprises a flexible diaphragm 20 having its outer periphery 21 secured between a pair of housing parts 22 and 23 to cooperate therewith to define a pair of chambers 24 and 25 on opposite sides 26 and 27 of the diaphragm 20, the inner periphery 28 of the flexible diaphragm 20 being interconnected to a post means 29 together with a diaphragm backup plate means 30. The post means 29 thereby moves in unison with the diaphragm 20 and has opposed ends 31 and 32 respectively secured in sealing relation to the housing parts 22 and 23 by balancing diaphragms 33 and 34 in a manner well known in the art.

The chamber 24 of the means 17 is adapted to be interconnected to the tube 15 that senses the total pressure of the air 13 flowing in the duct 12 by having a suitable conduit means 35 thereof connected to an inlet port means 36 of the housing means 22 whereas the tube 16 that senses the static pressure of the air 13 flowing in the duct 12 is adapted to be interconnected by a conduit means 37 to an inlet port means 38 of the housing part 23 that leads to the chamber 25 thereof.

In this manner, the diaphragm means 20 and, thus, the post means 29 is positioned in the transmitter 10 in relation to the difference between the total pressure in the chamber 24 and the static pressure in the chamber 25 so as to cause the output pneumatic signal producing means 18 to produce a signal in relation to the position of the post means 29 in a manner hereinafter described.

A nozzle means 39 is carried by the housing means 22 and has a nozzle opening 40 directed toward the underside 41 of the free end 42 of a flapper lever or baffle 43 that has its other end 44 pivotally mounted to the housing means 22 by suitably arranged fulcrum post means 45 in a manner well known in the art.

The nozzle means 39 is disposed in fluid communication with a conduit means 47 that leads to the output pneumatic signal producing means 18.

The output pneumatic signal producing means 18 comprises a flexible diaphragm means or movable wall 48 that has its medial portion 49 carrying a cup-shaped member 50 that is urged to the left in FIG. 1 by a compression spring 51 and having one end 52 bearing against an end wall 53 of the cup-shaped member 50 and another end 52' bearing against a wall 53' of a housing means 54. The diaphragm 48 has its other peripheral portion 55 carried by the housing means 54 in such a manner that the diaphragm 48 defines chambers 56 and 57 in the housing means 54 on opposite sides 58 and 59 of the diaphragm 48, the chamber 56 being disposed in fluid communication with the conduit means 47 for a purpose hereinafter set forth while the chamber 57 is freely interconnected to the exterior of the housing means 54.

A suitable pneumatic pressure source 60 is interconnected to a conduit 61 which has a restriction means 62 therein, the conduit 61 being adapted to direct the substantially linear output pneumatic signal 11 out through its outlet end 63 for a controlling purpose that is well known in the art and as will be apparent hereinafter.

The conduit means 61 is interconnected to the conduit means 47 by a branch conduit means 64 that is disposed downstream of the restrictor means 62 whereby the pressure value of the pressure fluid being directed through the conduit means 61 to its outlet means 63 is under the control of the amount of bleed provided by the flapper lever 43 relative to the nozzle means 39 as is well known in the art.

The end 32 of the post means 29 of the means 17 for measuring the differential pressure is interconnected to the flapper lever 43 at a point 65 thereof that is intermediate the ends 42 and 44 thereof by a suitable rigid tying means 66 so that the movement of the post means 29 upwardly and downwardly in FIG. 1 will cause the flapper lever 43 to pivot upwardly and downwardly in unison therewith at the fulcrum means 45 so that the end 42 will be moved further away from the nozzle outlet 40 as the post means 29 moves upwardly in FIG. 1 and will be moved closer to the nozzle outlet 40 as the post means 29 moves downwardly in FIG. 1.

In this manner, the differential pressure measuring means 17 is operatively interconnected to the flapper lever 43 to control the movement thereof as will be apparent hereinafter and, thus, is operatively interconnected to the output pneumatic signal producing means 18 as the pressure value in the chamber 56 thereof is determined by the pressure value permitted by the flapper lever 43 in relation to the position of its end 42 relative to the nozzle output 40 as is well known in the art. Thus, the pressure in the chamber 56 of the output pneumatic signal producing means 18 can cause the diaphragm 48 to move to the right in FIG. 1 in opposition to the force of the compression spring 51 as the pressure value in the chamber 56 increases and will cause the diaphragm 48 to move to the left under the force of the compression spring 51 as the pressure value in the chamber 56 decreases. This movement of the movable wall 48 of the output pneumatic signal producing means 18 is translated to a movable rigid rod means 67 that has one end 68 suitably fastened to the end wall 53 of the cup-shaped member 50 and the other end 69 thereof interconnected to a roller means 70 of the square root extractor device or means 19 for a purpose hereinafter described, the rod means 67 passing through a suitable opening 71 in the end wall 53' of the housing means 54 as illustrated and being interconnected to the roller means 70 by receiving center pins 70A of the roller means 70 in cooperating openings 70B of the rod means 67 so that the roller means 70 can roll or rotate relative to end 69 of the rod means 67.

The movement of the rod 67 is maintained substantially parallel to a substantially flat surface 72 of a plate means 73 on which the roller means 70 of the square root extractor device or means 19 is adapted to roll as will be apparent hereinafter.

The roller means 70 of the square root extractor means 19 comprises a substantially cylindrical member that has a substantially circular cross-sectional configuration throughout the length thereof with such circle being represented by the line 74 in FIG. 1 as well as by the circle 74 illustrated in FIG. 4 for a purpose hereinafter set forth.

A cam member or plate 75 is secured to an end 76' of the roller means 70 so as to move in unison with the roller means 70, the cam member 75 having a cam face 76 that defines part of the involute of the circle 74 and provides the square root extracting function for the transmitter 10.

In particular, the cam face 76 is operatively interconnected to the flapper lever 43 by a non-stretchable cable 77 and a tension spring 78, the tension spring having opposed ends 79 and 80 with the end 80 being effectively interconnected to the point 65 of the flapper lever 43 in any suitable manner such as by having the rigid tying means 66 extend to the side 41 of the lever 43 and beyond the other side 81 thereof so as to attach to the end 80 of the tension spring 78 as illustrated.

The cable 77 has opposed ends 82 and 83 with the end 82 of the cable 77 being effectively attached to a point 82' on the cam face 76 which comprises the point of origin from which the cam face 76 is developed as being the involute of the circle 74 as will be apparent hereinafter.

Figure 2:
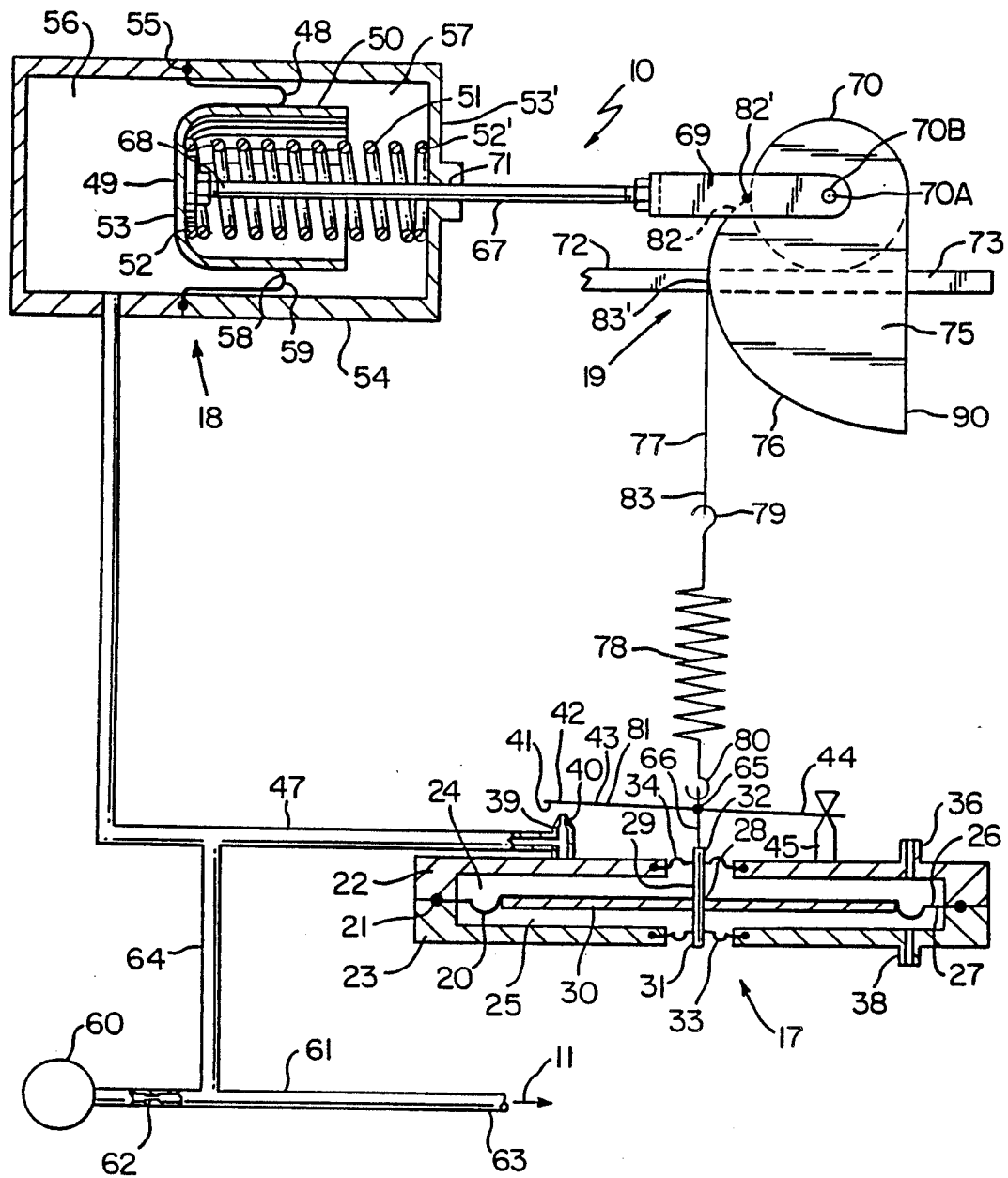
FIG. 2 is a view similar to FIG. 1 and illustrates the differential pressure transmitter in another operating position thereof.

Such point of origin 82 likewise defines a reference point 83' on the side of the plate 73 through which the cable 77 will always extend despite the amount of the cable 77 that is wound on the cam face 76 as the roller means 70 rolls from the position in FIG. 1 to the right, such as in the manner illustrated in FIG. 2. This is because the other end 83 of the cable 77 is interconnected to the end 79 of the tension spring 78 in any suitable manner so that the cable 77, tension spring 78 and post means 29 are all disposed in substantially coaxially straight lined relation throughout the entire normal range of operation of the transmitter 10 as will be apparent hereinafter.

Figure 3:
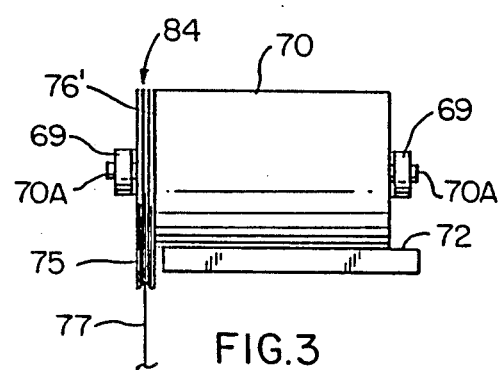
FIG. 3 is a fragmentary end view of part of the transmitter of FIG. 1 and is taken in the direction of the arrows 3—3 thereof.

In order to insure that the cable 77 will be properly held in its wound up relation on the cam face 76 of the cam member 75 as the roller means 70 rolls on the surface 72, the cam face 76 can be provided with a groove 84 therein that readily receives the cable 77 therein in a manner illustrated in FIG. 3, the bottom of the groove 84, if used, actually defining at least part of the involute of the circle described by the roller means 70 rather than the cam face 76 whereby the bottom of the groove 84 actually comprises the cam face of this invention.

In order to insure that the roller means 70 will roll on the flat surface 72 of the support plate 73 without any slippage therebetween, suitable means can be provided to prevent such slippage therebetween and three such means are generally indicated by the reference numerals 85, 86 and 87 respectively in FIGS. 5, 6 and 7 and which will be later described.

Therefore, it can be seen that the various parts of the transmitter 10 of this invention can be formed in a relatively simple manner and assembled together by the method of this invention to form the transmitter 10 which operates in a manner hereinafter set forth.

Figure 4:
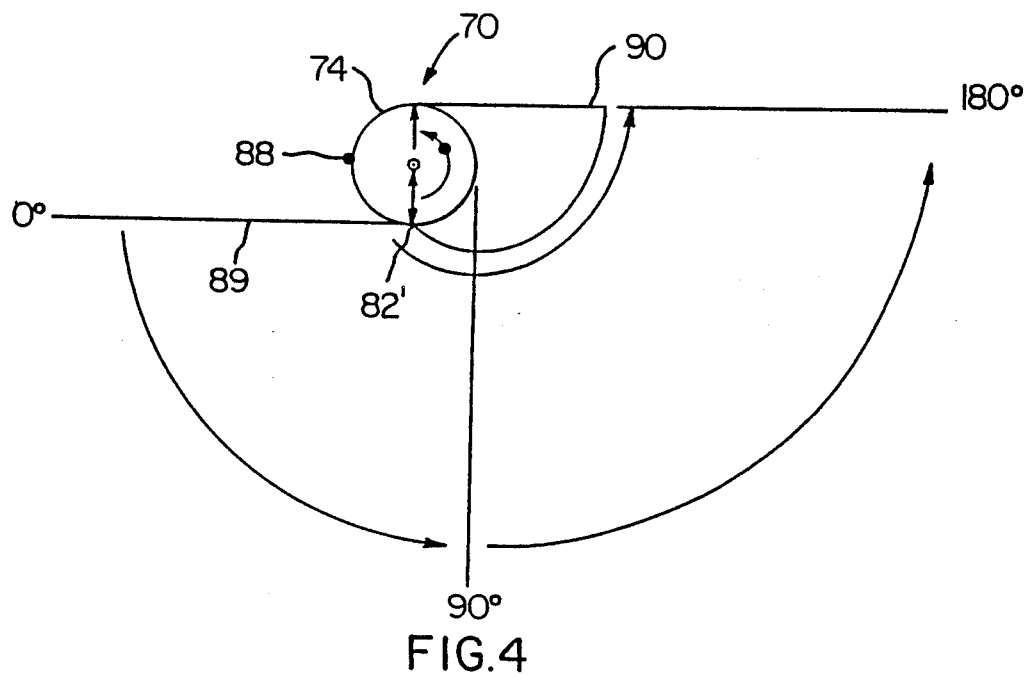
FIG. 4 is a schematic view illustrating how the cam face of the cam of the transmitter of FIG. 1 is defined.

The method of defining the cam face 76 of the cam member 75 for the particular roller means 70 is to take the roller means 70 and dispose the same on end as illustrated in FIG. 4 and an involute of the resulting circle 74 thereof may be drawn by fastening an end 88 of a nonstretching string 89 to the circle 74 and wrapping the same around the cylinder 74. Then, as the string 88 is unwrapped and while being held taut, a pencil point caught in a small knot, such as at the origin point 82' illustrated in FIG. 4, will begin to draw an involute as the pencil point leaves the perimeter of the circle 74 and will continue to do so as long as the string 89 is unwound. For the transmitter 10 of this invention, the "string" 89 need only be unwound about 180° as illustrated in FIG. 4. As the pencil point leaves the side of the cylinder 74 and begins to describe the arc of the involute, the length of the arc of the involute (beginning at the surface of the circle 74) is equal to one-half the radius of the circle 74 times the angle the string is unwound with the angle being in radians, squared, or the arc length equals $\frac{1}{2} r\theta^2$ where $\theta$ is measured in radians and $2\pi$ radians equals 360°.

For example, if the circle 74 is approximately 13/16ths of an inch in diameter and the length of the arc from the point of origin 82' to the end 90 of the arc at 180° then the length of the involute equals one-half (0.406 inches) (3.14$^2$) which equals 2.00 inches.

Thus, it can be seen that as the roller means 70 rolls on the surface 72 of the support plate 73, the edge of the cam face 76 remains at the original location 83' and continues to pull the cable 77 straight up through the origin mark 83' on the side of the plane surface 73. Accordingly, in using such an involute to make a square root extracting transmitter, if the lateral movement of the roller means 70 is called X and the vertical movement of the cable 77 past the upper edge 72 of the plane surface 73 is called Y, then Y equals (1/D) X$^2$ where D is the diameter of the roller means 70.

Thus, it can be seen that the transmitter 10 of this invention operates in the following manner.

The differential pressure measuring means 17 senses the input signals from the standard pilot tube 14 and produces an output signal 11 directly linear with respect to air velocity in the duct 12. This output signal 11 may be read out on a standard pneumatic gauge (not shown) interconnected to the end 63 of the conduit 61 or the end 63 of the conduit 61 can be connected to other control devices to provide control functions as desired.

The input signals to the transmitter 10 comprise the total pressure (velocity pressure plus static pressure) which is applied to the total pressure input connection 36 and the static pressure which is applied to the static pressure input connection 38. Since the same static pressure signal is applied both above and below the diaphragm 20 by the chambers 24 and 25, it is cancelled by the diaphragm 20 and the diaphragm senses only changes in velocity pressure.

Since velocity pressure of air varies as a constant times the square of air velocity ($Pv = KV^2$), the transmitter 10 must extract the square root from the output signal 11 as the output signal 11 is being generated for the output signal 11 to be directly proportional to changes in air velocity.

This is accomplished in the following manner.

As the air velocity 13 increases, the downward force of velocity pressure upon the diaphragm 20 increases causing the diaphragm 20 and its center post means 29 to move downwardly so that the end 42 of the flapper lever 43 moves closer to the nozzle outlet 40. As the flapper lever 43 approaches the nozzle outlet 40, the nozzle pressure increases and thereby causes the pressure in the chamber 56 of the output pneumatic signal producing means 18 to increase and to move the rod 67 to the right in the drawings in direct proportion to the increase in the nozzle pressure produced by the flapper lever 43. This causes the roller means 70 to roll along the flat surface 72 to the right without slippage between the roller means 70 and the surface 72. As the roller means 70 thus rolls, the cam face 76 pulls the cable 77 vertically upwardly through the origin line 83' and, as previously stated, the direction of pull of the cam following cable 77 on the tension spring 78 remains constant. Since the cam face 76 is the involute of the circle 74 of the roller means 70, the length along the cam face 76 beginning at the perimeter point 82' of the roller means 70 and extending to the end 90 of the cam face is directly proportional to the square of the distance the roller means 70 is rolled by the movement of the extending shaft 67 even though this movement is caused by a linear pressure change within the pressure to motion transducer means 18. The amount of upward pulling motion on the tension spring 78 by the cam following cable 77 (which opposes the initial downward motion of the diaphragm 20 and flapper lever 43 caused by the increase in velocity pressure) is directly proportional to the square of the distance the roller means 70 is rolled by the extending shaft 67.

The pressure to motion transducer means 18 is made large enough so that the changing pull of the cable 77 on the cam 75 has negligible effect on the movement of the transducer shaft 67.

Therefore, the squared effect of downward force on the diaphragm 20 (caused by velocity pressure increase being proportional to the square of velocity) is mechanically balanced by the squared effect of upward force on the diaphragm 20 applied by the linear pressure to motion transducer means 18 through the cam 75 and cable 77. Since the movement of the pressure to movement transducer means 18 is caused by a linear increase in nozzle (and output) pressure, the transmitter output pressure 11 is directly proportional to changes in air velocity in the duct 12.

As previously stated, the roller means 70 can be made to roll in a nonslipping manner on the surface 72 of the support plate 73 by any suitable means.

Figure 5:
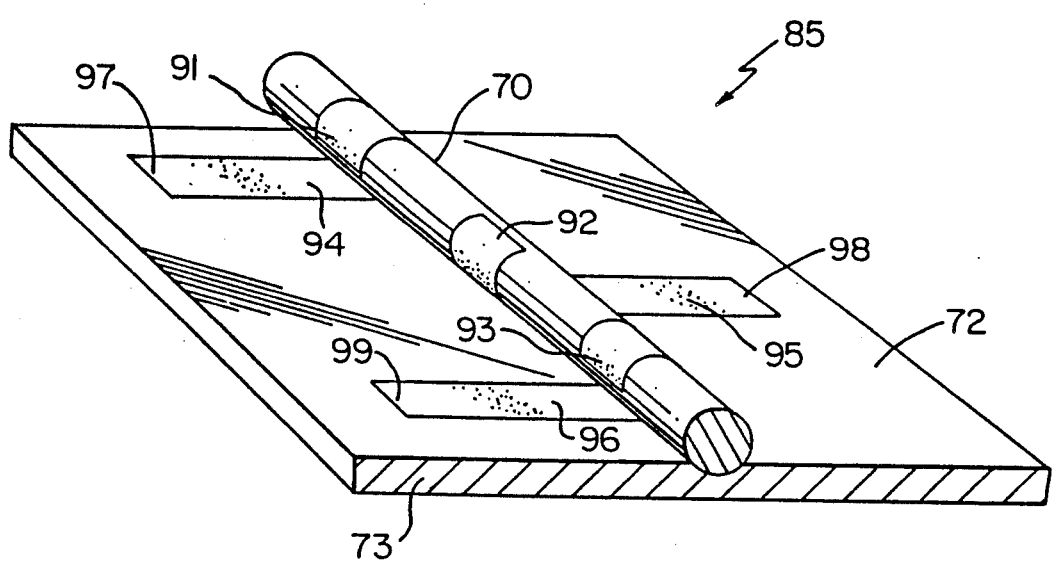
FIG. 5 is a perspective view illustrating another embodiment of the roller means that can be utilized in the transmitter of this invention.

For example, reference is now made to FIG. 5 wherein the means 85 is provided by the roller means 70 being interconnected to respective ends 91, 92 and 93 of three nonstretching tapes 94, 95 and 96 which respectively have the other ends 97, 98 and 99 thereof fastened to the surface 72 of the plate means 73. In this manner, the two tapes 94 and 96 extend in one direction and the tape 95 extends in the opposite direction with the center tape 95 wrapped around the cylinder 70 in one direction and the tapes 94 and 96 wrapped around the cylinder 70 in the other direction. In this manner, the roller means 70 will roll with extremely little friction and yet will not slip with respect to the surface 72.

Figure 6:
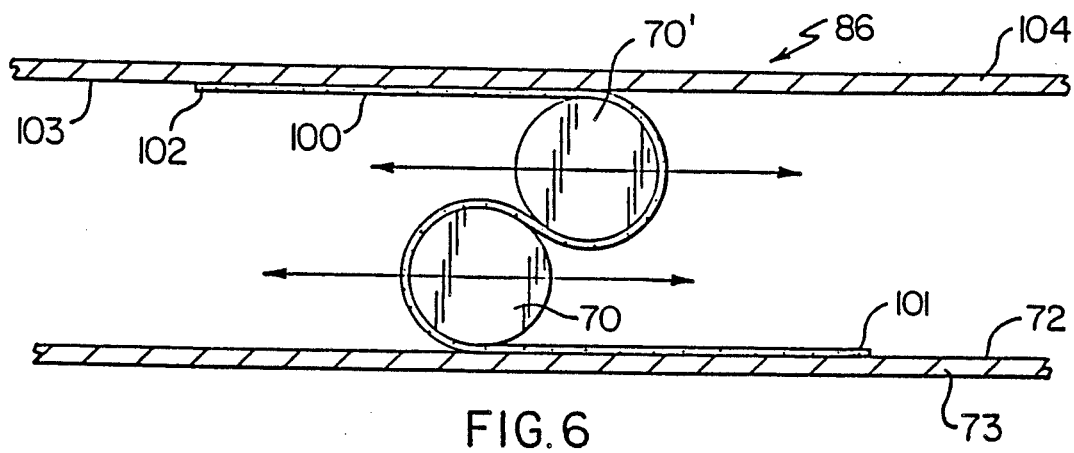
FIG. 6 is an end view, partially in cross section, illustrating another embodiment of the roller means that can be utilized in the transmitter of this invention.

The means 86 illustrated in FIG. 6 comprises the roller means 70 and another like roller means 70' held with a nonstretching tape 100 having one end 101 secured to the surface 72 of the support plate 73 and the other end 102 thereof secured to a flat surface 103 of another support plate 104 with the surface 103 of the support plate 102 being substantially parallel to the surface 72 of the lower plate 73 as illustrated. In this manner, both the roller means 70 and 70' will roll together back and forth with very little friction therebetween and the roller means 70 which carries the cam member 75 will roll on the surface 72 without slipping thereon.

Figure 7:
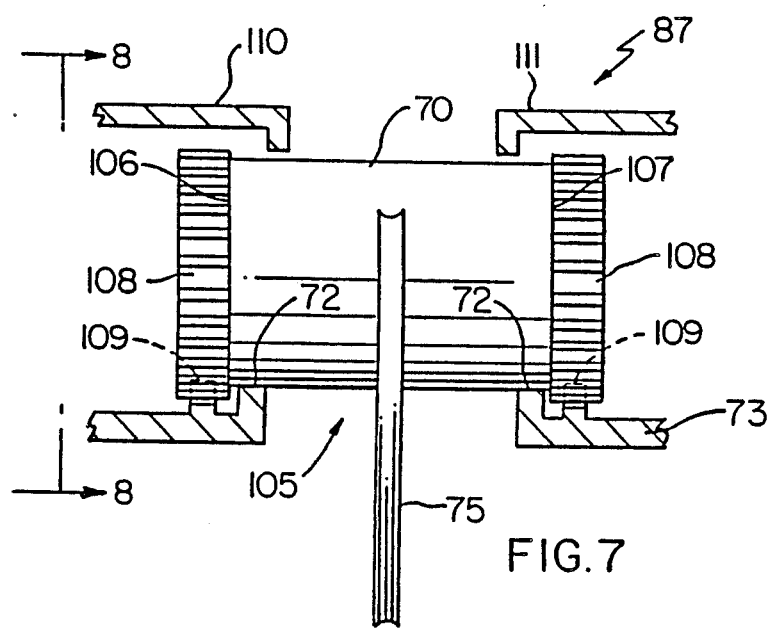
FIG. 7 is a fragmentary view of another roller means that can be utilized in the transmitter of this invention.
Figure 8:
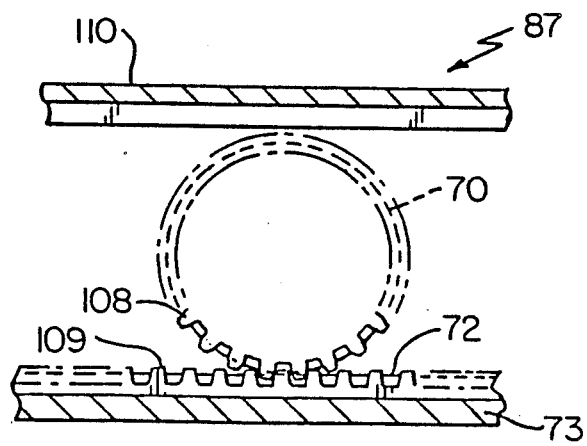
FIG. 8 is a fragmentary cross-sectional view taken on line 8—8 of FIG. 7.

The means 87 of FIGS. 7 and 8 causes the roller means 70 to roll on the surface 72 of the support plate 73 which has a slot 105 therein and through which the cam member 75 can move as the cam member 75 is carried by the roller means 70 intermediate the opposed ends 106 and 107 thereof. Each end 106 and 107 of the roller 70 has a pinion gear 108 thereon that is disposed in meshing relation with an outwardly extending rack 109 disposed on the surface 72 of the plate 73, the pitch diameter of each pinion gear 108 being substantially equal to the diameter of the roller 70. In this manner by having the pinions 108 disposed in a nonbottoming manner in the teeth of the racks 109 and having upper rails 110 and 111 to cooperate with the ends 106 and 107 of the roller means 70 to maintain the gears 108 and 109 in meshing relation, the roller 90 will roll on the plane surface 72 without slipping thereon However, it is to be understood that other means could also be provided to cause the roller means 70 to roll in a substantially nonslipping manner on the surface 72 of the support plate 73, as desired.

When the differential pressure measuring means 17 senses that the air velocity 13 decreases, the downward force of velocity pressure upon the diaphragm 20 thereof decreases causing the diaphragm and its center post 29 to move upwardly so that the end 42 of the flapper lever 43 moves away from the nozzle outlet 40. In this manner, the nozzle pressure decreases and thereby causes the pressure in the chamber 56 of the output pneumatic signal producing means 18 to decrease so that the rod 67 moves to the left in the drawings by the force of the spring 51. This causes the roller means 70 to roll along the surface 72 of the plate 73 to the left and unwind the cable 77 therefrom which decreases the force that the tension spring 78 applies to the diaphragm 20. Thus, the upward force on the diaphragm 20 caused by the velocity decrease is mechanically balanced by the decrease of upward force applied by the tension spring 78 as the length of the cable 77 between the cam face 76 and the tension spring 78 is increased by the roller 70 rolling to the left in the drawings. Since the movement of the rod 67 of the transducer means 18 is caused by a linear decrease in nozzle (and output) pressure, the transmitter output pressure 11 will be decreased directly proportional to the decrease in the air velocity in the duct 12 in a manner that is converse to the increase in the signal pressure 11 upon an increase in the air velocity 13 previously described.

Therefore, it can be seen that by calibrating the differential pressure transmitter 10 in a manner well known in the art, the transmitter 10 can produce a low output signal 11 of approximately 3 psig when the roller means 70 has rolled to the left on the surface 72 to its maximum left position and a high output signal 11 of approximately 15 psig when the roller means 70 has rolled to the right on the surface 72 to its maximum right position, such left and right maximum positions being defined by the unwound and wound limits of the cable 77 on the particular cam face 76 being utilized.

Thus, it can be seen that this invention not only provides a new differential pressure transmitter and a new square root extractor device therefor, but also this invention provides new methods of making such a differential pressure transmitter and square root extractor device therefor.

While the forms and methods of this invention now preferred have been illustrated and described as required by the Patent Statute, it is to be understood that other forms and method steps can be utilized and still fall within the scope of the appended claims wherein each claim sets forth what is believed to be known in each claim prior to this invention in the portion of each claim that is disposed before the terms "the improvement" and sets forth what is believed to be new in each claim according to this invention in the portion of each claim that is disposed after the terms "the improvement" whereby it is believed that each claim sets forth a novel, useful and unobvious invention within the purview of the Patent Statute.

What is claimed is:

1. In a differential pressure transmitter comprising means for producing an output pneumatic signal from a pneumatic source in relation to the air velocity pressure of air flowing in a passage, means that senses the difference between the total pressure and the static pressure of said air flowing in said passage, and means for extracting the square root of said air velocity pressure of said air from said pneumatic output signal as said pneumatic output signal is being produced so that said pneumatic output signal is substantially linear with respect to said air velocity of said air flow in said passage whereby said transmitter comprises a linear air velocity transmitter, the improvement wherein said means for extracting the square root comprises a cam having a cam face that defines at least part of the involute of a circle.

2. In a pneumatically operated square root extracting device having means for extracting the square root of an input signal from an output pneumatic signal thereof and comprising a movable means for acting on a flapper lever that controls a bleed nozzle of said device, said device having a movable wall carried by said device and defining an output signal chamber therewith whereby the position of said wall is determined by the pressure in said output signal chamber, said wall being operatively interconnected to said movable means to position the same relative to said flapper lever in relation to the pressure in said output signal chamber, the improvement wherein said movable means comprises a cam operatively interconnected to said movable wall and having a cam face that defines at least part of the involute of a circle, and means operatively interconnecting said cam face to said flapper lever to control the same in relation to movement of said cam by said movable wall.

* * * * *